United States Patent
Zhang et al.

(10) Patent No.: US 12,200,001 B2
(45) Date of Patent: *Jan. 14, 2025

(54) BEHAVIOR BASED PROFILING

(71) Applicant: FORESCOUT TECHNOLOGIES, INC., San Jose, CA (US)

(72) Inventors: Yang Zhang, Fremont, CA (US); Arun Raghuramu, San Jose, CA (US); Siying Yang, Cupertino, CA (US)

(73) Assignee: Forescout Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,912

(22) Filed: Oct. 5, 2023

(65) Prior Publication Data
US 2024/0048578 A1 Feb. 8, 2024

Related U.S. Application Data

(63) Continuation of application No. 16/297,335, filed on Mar. 8, 2019, now Pat. No. 11,843,621.

(51) Int. Cl.
*H04L 9/40* (2022.01)
*G06F 16/28* (2019.01)
(Continued)

(52) U.S. Cl.
CPC ........ *H04L 63/1425* (2013.01); *G06F 16/285* (2019.01); *G06F 16/288* (2019.01); *G06N 5/047* (2013.01); *G06N 20/00* (2019.01)

(58) Field of Classification Search
CPC . H04L 63/1425; G06F 16/285; G06F 16/288; G06N 5/047; G06N 20/00
(Continued)

(56) References Cited

U.S. PATENT DOCUMENTS 7,002,974 B1 * 2/2006 Deerman ............ H04L 49/9036
709/224
9,306,960 B1 4/2016 Aziz
(Continued)

FOREIGN PATENT DOCUMENTS

CN 101119241 A 8/2009

OTHER PUBLICATIONS

Soo-Yeon Lee; ProFiOt: Abnormal Behavior Profiling (ABP) of IoT devices based on a Machine; IEEE:2017; pp. 1-6.*
(Continued)

*Primary Examiner* — Monjur Rahim
(74) *Attorney, Agent, or Firm* — Womble Bond Dickinson (US) LLP

(57) ABSTRACT

Systems, methods, and related technologies for profiling an entity and classifying an entity based on a profile are described. In certain aspects, data associated with communications of a first entity on a network are accessed, behaviors are determined based on the data associated with the communications of the first entity, and sequences of the behaviors of the first entity are determined. A profile of the first entity is determined based on the sequences of the behaviors, the profile including a classification of the first entity, a state machine of the profile of the first entity is determined, the state machine being associated with the classification against which the behaviors can be matched, a second entity is detected coming onto the network, and responsive to detecting the second entity coming onto the network, the second entity is classified based on the state machine of the profile of the first entity.

17 Claims, 7 Drawing Sheets

(51) Int. Cl.
   *G06N 5/047* (2023.01)
   *G06N 20/00* (2019.01)
(58) Field of Classification Search
   USPC .......................................................... 726/22
   See application file for complete search history.

(56) References Cited

U.S. PATENT DOCUMENTS

| | | | |
|---|---|---|---|
| 10,326,676 | B1 | 6/2019 | Driggs et al. |
| 11,297,362 | B2* | 4/2022 | James .............. H04N 21/25875 |
| 2004/0215770 | A1* | 10/2004 | Maher, III .......... H04L 41/0893 |
| | | | 379/900 |
| 2008/0057944 | A1* | 3/2008 | Miriyala ............... H04W 48/18 |
| | | | 455/425 |
| 2013/0267201 | A1* | 10/2013 | Gupta ................. H04W 12/128 |
| | | | 455/411 |
| 2013/0291107 | A1 | 10/2013 | Marck et al. |
| 2014/0150100 | A1* | 5/2014 | Gupta ................. H04L 63/1425 |
| | | | 726/22 |
| 2014/0317734 | A1* | 10/2014 | Valencia ............... G06F 21/552 |
| | | | 726/22 |
| 2016/0357232 | A1* | 12/2016 | Kalyanasundaram ...................... |
| | | | G06F 1/3296 |
| 2018/0004948 | A1* | 1/2018 | Martin ................ H04L 63/1425 |
| 2018/0096329 | A1* | 4/2018 | Hamilton ............. G06Q 20/322 |
| 2018/0115574 | A1* | 4/2018 | Ridley .................... H04L 43/50 |
| 2018/0211179 | A1* | 7/2018 | Dzierwa .............. H04B 17/391 |
| 2018/0219888 | A1* | 8/2018 | Apostolopoulos .... G06F 21/554 |
| 2018/0375887 | A1 | 12/2018 | Dezent et al. |
| 2020/0285737 | A1 | 9/2020 | Kraus et al. |

OTHER PUBLICATIONS

International Search Report and Written Opinion for International Application No. PCT/US2020/019447, mailed May 20, 2020.
Singh et al., "HANZO: Collaborative Network Defense for Connected Things", 2018 Principles, Systems and Applications of IP Telecommunications, Oct. 16, 2018, pp. 1-8.
Miettinen et al., "IoT Sentinel: Automated Device-Type Identification for Security Environment in IoT", arxiv.org, Dec. 13, 2016, retrieved from the Internet URL: https://arxiv.org/pdf/1611.04880.pdf.
Transmittal of International Preliminary Report on Patentability of International Application No. PCT/US2020/019447, mailed Sep. 23, 2021.

* cited by examiner

BEHAVIOR BASED PROFILING

CROSS-REFERENCE TO RELATED APPLICATIONS

This application is a continuation of U.S. patent application Ser. No. 16/297,335, filed Mar. 8, 2019, the entire contents of which are hereby incorporated by reference.

TECHNICAL FIELD

Aspects and implementations of the present disclosure relate to network monitoring, and more specifically, to profiling to build profiles for classification and classification based on profiles.

BACKGROUND

As technology advances, the number and variety of devices that are connected to communications networks are rapidly increasing. Each device may have its own respective vulnerabilities which may leave the network open to compromise or other risks. The classification of devices connected to a network can be useful for monitoring and securing the communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
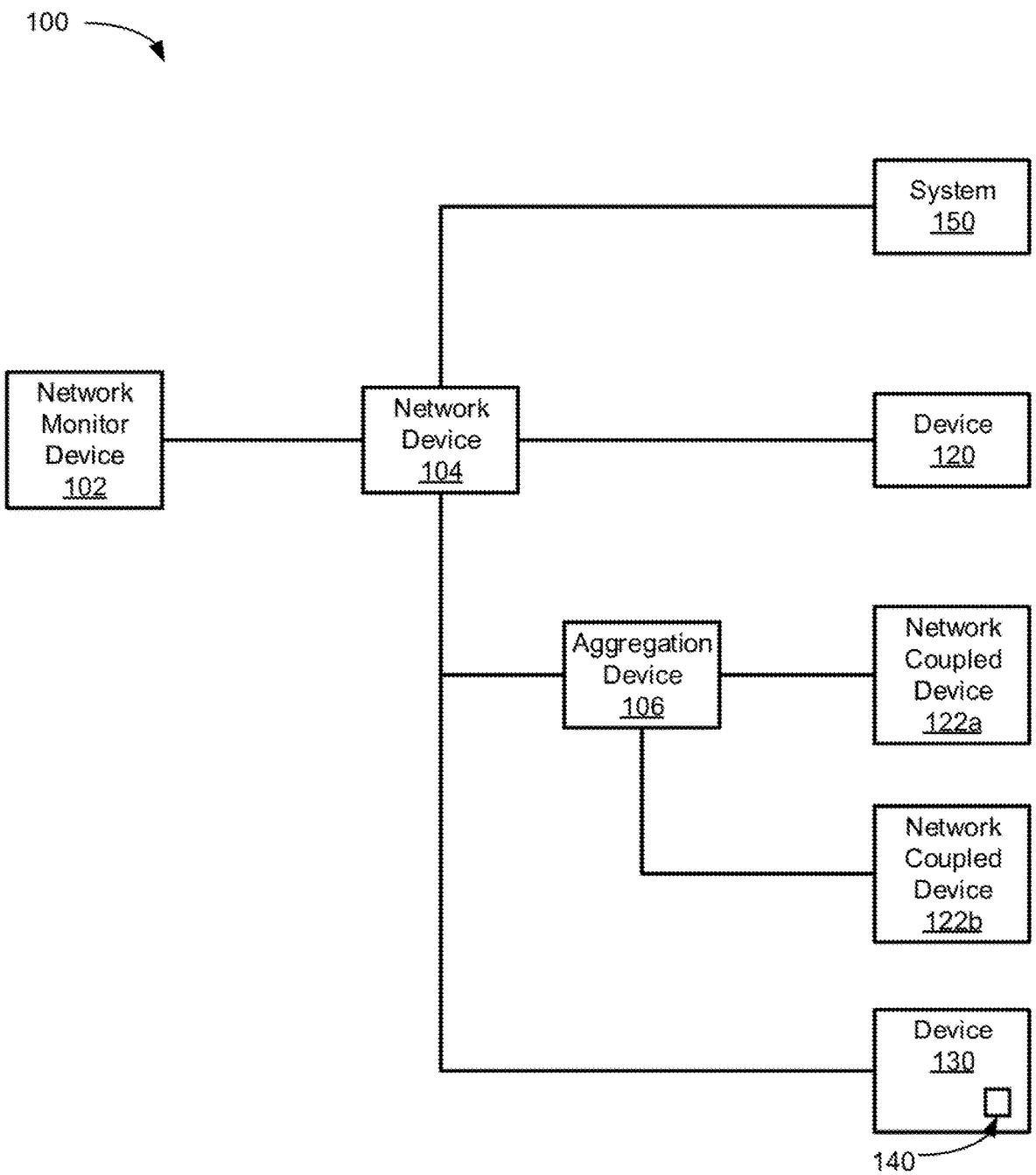
FIG. 1 depicts an illustrative communication network in accordance with one implementation of the present disclosure.

Aspects and implementations of the present disclosure are directed to profiling and classification (but may applicable in other areas). The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras, wearable devices, medical devices, etc.) can make it difficult to effectively ensure that network security is maintained. Accordingly, described herein in various implementations are systems, methods, techniques, and related technologies, which enable the ongoing scanning of networks and profiling and classifying of entities (e.g., devices) communicatively coupled to the network so that the devices or entities can be monitored for vulnerabilities, threats, and actions taken (e.g., based on a policy).

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service).

The number of devices being introduced is rapidly increasing and new devices are being introduced into new environments with increasing frequency. For example, Internet of things (IoT) devices are being used for various applications ranging from households to large industries on a very large scale. Different IoT devices have different security capabilities thus making maintaining the security and avoiding of a data breach of IoT systems becomes a very challenging task. Users cannot protect their devices if they cannot see them. To deal with this, classification mechanisms of IoT devices are used. Classification is particularly important for securing a network because lack of knowledge about what a device can prevent application of appropriate security measures. Current device classification methodologies are based on static attributes of a device including media access control (MAC) address, dynamic host control protocol (DHCP), Nmap™, or packet payload strings, which are far from sufficient enough to provide accurate results.

Current classification methodologies further do not correlate static attributes and identify relationships and heuristics behind the attributes. The information that can be obtained from the static attributes can be limited in providing a comprehensive and accurate device classification.

Embodiments can perform behavior based entity profiling that can be used to help identify and classify a variety of entities, e.g., including IoT devices. A profile is a behavior based fingerprint. Embodiments investigate entity behaviors from a temporal perspective and event perspective, determine correlations among the behaviors, and determine unique behavior of the entity for profile generation. Embodiments are thus able to determine behavior from a temporal perspective and activity within a certain time period that is unique to an entity. A profile can then be used to classify one or more entities.

For example, an infusion pump can be used as a standalone device but when the pumping task is performed, the infusion pump will communicate with a dedicated pump analyzer, which is a different device with its own IP address, to transfer the pumping information and fetch analysis results. During this procedure, there will be a series of sessions belonging to a configuration handshake, authentication, and data transfer. These sessions will use specific port and protocols and follow a sequential order. Recording this behavior series as a pattern, embodiments are able to use it as a strong heuristic to profile the infusion pump and analyzer. For example, embodiments can recognize that the infusion pump goes through a sequence of behaviors each time including a handshake, an authentication, and then a data transfer which are then correlated to profile the infusion pump. The profile can be then be used to classify other infusion pumps.

Embodiments may further use static attributes in combination with behaviors to determine profile an entity. For example, the infusion pump may be associated with a variety of static attributes including, but not limited to, using a particular port, particular encryption or security certificate, cipher suite, perform data transfers of a particular size, and hypertext transfer protocol (HTTP) user-agent string. Static attributes and behavior may thus be used in a complimentary manner by embodiments.

Embodiments are able to perform state based detection based on detecting one or more particular behaviors within particular time periods being associated with certain activity within a prior or subsequent time period. For example, embodiments may detect a first behavior within a first period of time, a second behavior within a second period of time, and then a third behavior subsequently (e.g., with a variable time period or opened ended time period).

Embodiments are able to detect and analyze behavior that is missed by attributes (e.g., static attributes). A single snapshot in time associated with a static attribute does not consider time series behavior. A static attribute may change from time to time which means the static attribute does not unique identify or indicate a particular device. For example, if there are two sessions over user datagram protocol (UDP) over a period of time, possibly on the same port, the use of static attributes would indicate that whether there is a UDP session or not at one point in time which misses the fact that some state change has happened for the two sessions over UDP over a period of time. In other words, information is lost if state changes are not considered. More information can be maintained and tracked as each state is considered by embodiments thereby enabling better utilization of the available information. In addition, correlations of the state changes can be used to profile, classify, or identify a device. The use of instantaneous attribute snapshots is limited whereas embodiments monitor behavior over time.

Embodiments are able to determine state machines which can be distinct for a variety of devices, including, IoT devices which usually have relatively limited behavior. The distinctness of IoT devices can be used based on the fact that IoT devices are often fixed function or have very limited functionality thereby allowing embodiments to fingerprint them based on distinct network behavior.

For example, a smart television (TV) will contact its update server for update information when it is turned on or powered on. If there is a new software or firmware update available, the smart TV will download the update file and install the update file. Usually the uniform resource locator (URL) of the update server (e.g., http://update.tv-manufacturer.com) and associated DNS request does not change and the HTTP request to check for updates and download the files are the same over time. Further, the files download are typically the same data file type or update (e.g., text file, cabinet (CAB) file, etc.). In some embodiments, file type information may be accessed by communicating with a firewall (e.g., that is configured to monitor applications). Correlating these activities over time as behaviors can be used to classify an entity as a smart TV.

As another example, a printer usually runs a printing service and receives file uploads regularly as users initiate printing of files. The file uploads are typically on a particular port (e.g., port 9100). The behaviors of frequently receiving file uploads (e.g., along with the port) over various periods of time can be used by embodiments to classify an entity as a printer.

As yet another example, when an IoT device is first admitted to the network, usually there are a few initial configurations and handshake packets that follow a particular pattern and order and the time to live (TTL) value is sometimes unique for different devices. Often the TTL is different for various operating systems (e.g., Microsoft Windows™, Linux, UNIX, mobile operating systems, etc.) which can be used as a clue to the operating system and device type. The operating system may be used as a static attribute that is used along with one or more behaviors to determine a profile for an entity or to classify an entity.

The protocol used by a device can also be used by embodiments in combination with behavior to determine a profile for an entity or to classify an entity. For example, entities using cloud based resources may communicate using the message queuing telemetry transport (MATT) protocol. The entity may maintain a subscription to a cloud via one or more sessions and receive publish messages (e.g., comprising commands) from the cloud. Embodiments may thus observe the subscriptions to the cloud by an entity and the publish behavior of the cloud over time.

By combining and correlating behaviors across multiple sessions, embodiments are able to create a behavior baseline to profile an entity type. This behavior baseline can be used to profile or classify a group of devices in the same category and help resolve conflicts for classifications based on signatures (e.g., static attribute signatures). For example, if behavior of existing IP cameras are known, embodiments can predict possible new IP cameras that do not yet have signatures. As another example, if an entity matches two signatures and it is not possible to determine (e.g., within a confidence threshold) what an entity should be classified as (e.g., an IP camera vs. a printer), embodiments can resolve the conflict by observing behavior. If behavior of an entity transferring a video file is observed, which would not typical of a printer, then the entity can be classified as an IP camera. Embodiments are thus able to resolve static attribute based conflicts (e.g., based on behavior).

Based on using (static attribute) signatures, if a signature associated with a device is not available, the device cannot be classified. Since embodiments are able to classify devices based on behavior, general behavior commonality can be used to classify a device. For example, if an unknown IP camera come onto a network that there is not a static attribute signature for but the IP camera has the same behavior as other IP cameras, then the unknown camera can be classified (e.g., automatically) as an IP camera. Embodiments are thus able to classify devices without the need for an exact static attribute signature match for each entity.

Embodiments may further identify unknown devices and group them into a class based on other known entity groups. For example, if a set of cameras behave a particular way, like an expected state machine, when a new device is introduced into the network and behaves like a camera, it can be classified as a camera. A camera's general behavior may include streaming data to a particular location frequently or on a continuous basis, periodically checking for updates, then powering down and powering back up after downloading an update.

Embodiments can also be extended to model device anomalies and be used to detect network threats and IoT device vulnerabilities.

The use of stateful analysis allows for tracking behaviors within a particular period of time and tracking behaviors that occur in a sequence without a particular time period of time (e.g., by waiting in a particular state for the next action). For example, the time for a camera upload of data may vary with time depending on the amount of compression that can be applied to the video whereas the behaviors to set up the connection for transferring data may occur within a particular time period. Embodiments may also determine or utilize a state machine based on an entity behavior occurring (e.g., within any time period) or a static attribute occurring at a point in time followed by one or more subsequent behaviors within a period of time.

In some embodiments, different profiles (e.g., including different state machines) may be used for different time periods. For example, there could be a state machine for classifying an entity based on behavior over a one day time period, a state machine for classifying an entity based on behavior over a one hour time period, and a state machine for classifying an entity based on behavior over a five minute time period.

In some embodiments, the time periods may be relaxed or be associated with a toleration or threshold for variance to allow more adaptive classification. For example, longer time periods may allow for adapting classification to situations where a server that is being connected to is overloaded or network congestion or the device being classified is operating slower than normal.

Advantageously, embodiments are operable for passive entity profiling through correlation of behavior to entities to enable better classification. Embodiments enable classification beyond static attributes (e.g., MAC address, DHCP, Nmap, payload string, etc.), to now include behavior based on entity behaviors from a temporal perspective, the correlation among the behaviors, and a determination of the unique behaviors of different entities. For example, the behaviors may include a series of sessions including configuration handshake, authentication, and data transfer, specific ports and protocols used, and the sequential order of the sessions. The behavior analysis may be used to identify multiple devices based on their interactions with each other (e.g., an infusion pump and a pump analyzer). By combining and correlating behaviors across multiple sessions, embodiments are able to determine a behavior baseline to profile an entity type. The behavior baseline can then be used to profile a group of devices in the same category and help resolve conflicts for existing signature (e.g., static attribute) based classification solutions.

Embodiments are able to determine entity profiles and perform profiling based on passive network traffic and log monitoring, without active scanning, and thereby have minimal impact on the entities of a network. This is particularly relevant for entities that do not support or handle well active scanning. Embodiments further provide comprehensive entity profiling based on essential behavior that can provide a more comprehensive and accurate result, even when some static attributes are missing or not reliable. Embodiments are further able to profile categories of entities and precisely resolve conflicts among different entity categories.

In some embodiments, cloud compute resources or local compute resources (e.g., a server on the same network) of an entity (e.g., network device 102) performing profiling, classification, or combination thereof can be used. The usage of additional compute resources may done during times where the device performing classification has insufficient resources (e.g., compute bandwidth) for performing the profiling, classification, or a combination thereof. In some embodiments, the entity performing profiling, classification, or a combination thereof may perform the profiling or classification when there is an idle period or reduced network traffic (e.g., 3 AM or early in the morning in the local time zone). In various embodiments, remote compute resources may be used to refine behavior profiles (e.g., state machines) based on logs or other data from multiple networks.

Accordingly, described herein in various implementations are systems, methods, techniques, and related technologies, which enable behavior based profiling and classification based on the profiling. As described herein, various techniques can be used to determine entity profiles based on behavior and perform classification using the entity profiles.

It can be appreciated that the described technologies are directed to and address specific technical challenges and longstanding deficiencies in multiple technical areas, including but not limited to network security, monitoring, profiling, classification, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, medical devices, infrastructure devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including determining a profile (e.g., a behavior based profile) of an entity, classifying an entity based on one or more profiles, or a combination thereof, as described herein. The classification of devices on network 100 may be performed periodically or based on devices being communicatively coupled to network 100 (e.g., recoupled to the network or communicatively coupled for the first time). Network monitor device 102 may perform a method for determining of a profile including accessing data associated with one or more communications of an entity and determining one or more behaviors based on the data associated with the one or more communications of the entity. The method further includes determining one or more sequences of the one or more behaviors of the entity and determining a profile based on the one or more sequences of the one or more behaviors, where the profile comprises a classification of the entity. The method further includes storing the profile.

Network monitor device 102 may further perform a method for classifying an entity including accessing data associated with one or more communications of an entity and accessing one or more entity profiles, where the entity profiles comprises one or more behavior sequences. The method further includes determining one or more behaviors from the data associated with one or more communications of the entity and determining a classification of the entity based on a matching of a behavior sequence of at least one entity profile of the one or more entity profiles with the one or more behaviors determined from the data associated with the one or more communications of the entity. The method further includes storing the classification.

In some embodiments, an initial scan (or classification using one or more less invasive classification methods) of the network 100 is performed to determine if any devices (e.g., devices 106 and 120-130) are sensitive to certain classification methods. For example, if device 120 or device 106 are medical devices, OT devices, or other infrastructure devices, network monitor device 102 may determine that classification methods that include active probing should be disabled or not performed during classification of devices on network 100 (e.g., using a plurality of classification methods).

Network monitor device 102 may further perform a variety of operations including identification, classification, and taking one or more remediation actions (e.g., changing network access of an account, disabling an account, modifying a configuration of a network device, changing access permissions on a cloud storage resource, sending an email or short message service (SMS) alert, etc.) based on the results of the classification/identification. For example, based on a device classification as an IP camera, the device may be restricted from the Internet or accessing sensitive parts of the network.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, a CLI, a web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more properties or information associated with entities. For example, a vulnerability assessment (VA) system may be queried to access information about a device or entity (e.g., particular IOCs associated with an account or cloud storage resource) or if an entity is in compliance. External or $3^{rd}$ party systems may also be used to perform a scan or a check on an entity to determine a software version, compliance, or gather information associated with an entity.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122*a-b*. System 150 may include a vulnerability assessment (VA) system, a threat detection (TD) system, an endpoint management system, a mobile device management (MDM) system, a firewall (FW) system, a switch system, an access point system, etc. Network monitor device 102 may be configured to communicate with system 150 to obtain information about devices 120 and 130, and network coupled devices 122*a-b* on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122*a-b* and provide network access to network coupled devices 122*a-b*. Aggregation device 106 may further be configured to provide information (e.g., operating system, device entity software information, entity software versions, entity names, application present, running, or both, vulnerabilities, patch level, etc.) to network monitor device 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor device 102. It is appreciated that log information may be particularly reliable for stable network environments (e.g., where the types of devices on the network do not change often). The log information may include information of updates of software of network coupled devices 122*a-b*.

Figure 2:
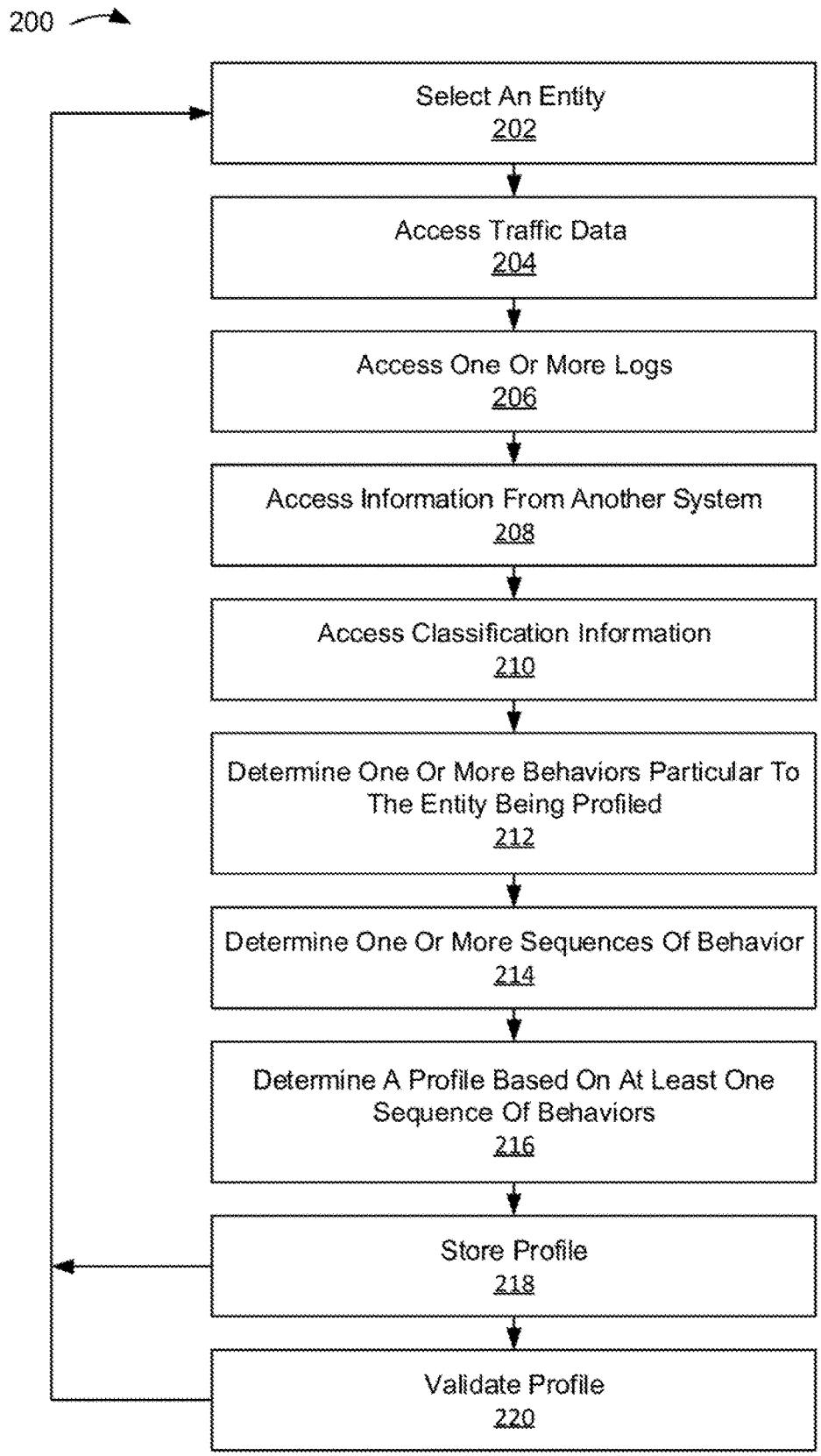
FIG. 2 depicts a flow diagram of aspects of a method for determining a profile based on behavior in accordance with one implementation of the present disclosure.
Figure 4:
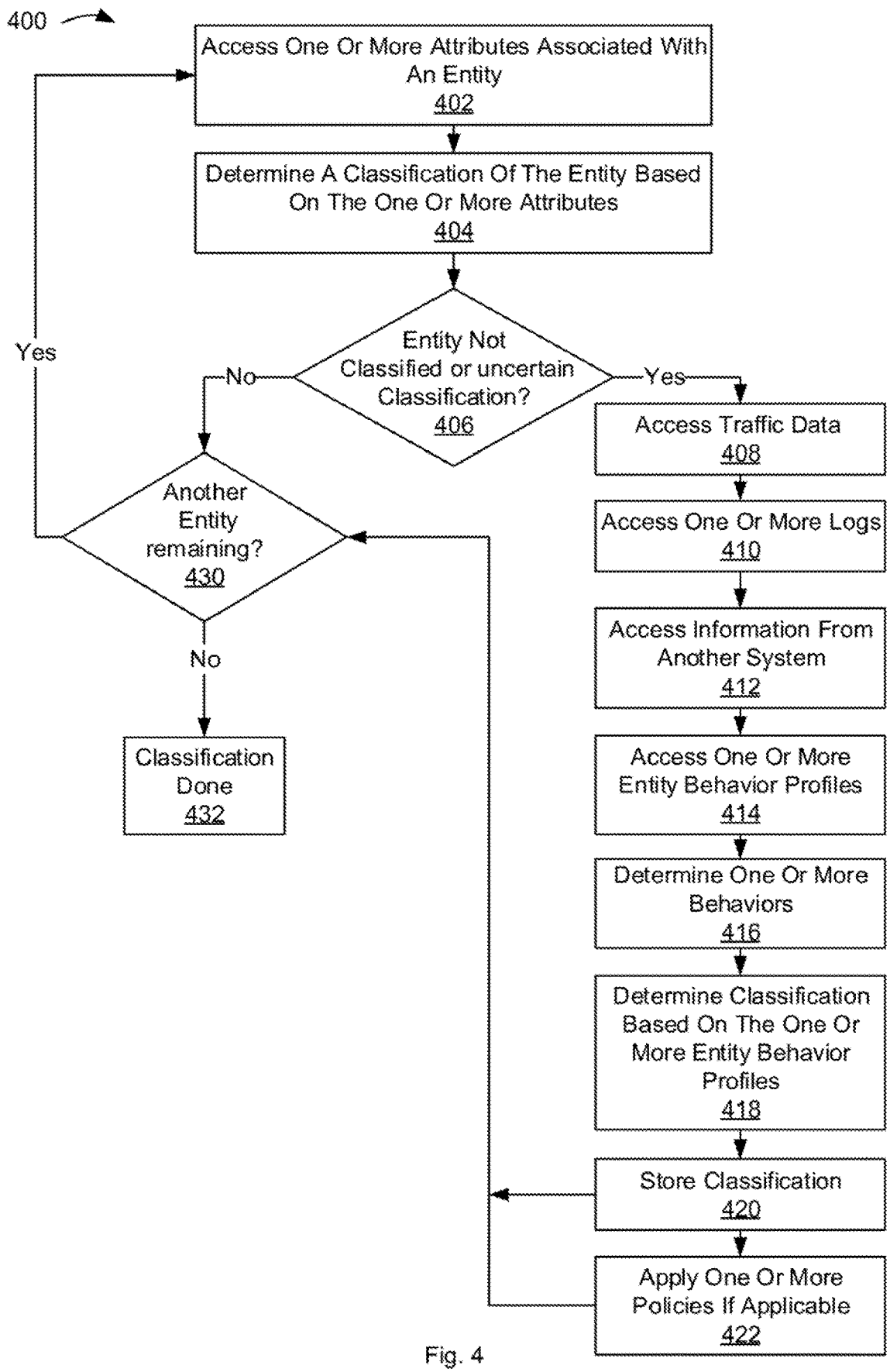
FIG. 4 depicts a flow diagram of aspects of a method for determining a classification based on a profile comprising behavior information in accordance with one implementation of the present disclosure.

With reference to FIGS. 2 and 4, flowcharts 200 and 400 illustrate example operations used by various embodiments. Although specific operation blocks ("blocks") are disclosed in flowcharts 200 and 400, such blocks are examples. That is, embodiments are well suited to performing various other blocks or variations of the blocks recited in flowcharts 200 and 400. It is appreciated that the blocks in flowcharts 200 and 400 may be performed in an order different than presented, and that not all of the blocks in flowcharts 200 and 400 may be performed.

FIG. 2 depicts a flow diagram of aspects of a method for determining a profile based on behavior in accordance with one implementation of the present disclosure. Flowchart 200 shows a process for determining profiles based on behavior and other data (e.g., based on static attributes). The profiles can be used for classifying devices. Various portions of flowchart 200 may be performed by different components (e.g., components of system 300) of an entity (e.g., network monitor device 102). The process of flowchart 200 may be performed by a NAC device as part of a classification process. Embodiments support various blocks of flowchart 200 being performed locally on a network, remotely (e.g., in the cloud), or any combination thereof.

At block 202, an entity is selected. The entity may be selected based on not being classified, being associated with a classification conflict, or unclear or uncertain classification (e.g., based on static attributes). The selection may occur upon an entity being communicatively coupled to a network or as part of a periodic or continuous scan of the network.

At block 204, traffic data is accessed. The traffic data may be accessed from various network devices including, but not limited to, a switch, a firewall, a router, a wireless access point, etc. The traffic data accessed may be pre-filtered or a selected portion of traffic on a network. For example, the traffic data may be accessed for a particular VLAN, portion of the network, or segment of the network (e.g., where an unknown entity has been recorded communicating) to filter the traffic data.

At block 206, one or more logs are accessed. The logs may be various traffic, communication, or other transaction based logs (e.g., an authentication log). The logs may be accessed from a variety of sources including, but not limited, to servers on a network (e.g., file servers, web servers, applications servers, etc.), network devices (e.g., switches, firewalls, routers, etc.), and other systems (e.g., a vulnerability assessment (VA) system, a threat detection (TD) system, an endpoint management system, a mobile device management (MDM) system, a firewall (FW) system, a switch system, an access point system, a security information and event management (SIEM) system, etc.).

At block 208, information from another system (e.g., system 150) is accessed. The other systems may include, but are not limited to, a vulnerability assessment (VA) system, a threat detection (TD) system, a mobile device management (MDM) system, a firewall (FW) system, a switch system, an access point system, SIEM system, etc. The information may include vulnerability information, threat information, mobile device information, network communication behavior, etc.

At block 210, classification information is accessed. The classification information may be based on a classification performed by the entity performing the profiling (e.g., process 200). In some embodiments, the entity (e.g., network monitor device 102) performing the classification will perform an initial classification of the entities of an environment or network for one or more static attributes. The type of environment may also be determined based on this classification (e.g., a hospital, industrial, campus, data center, or other environment).

In various embodiments, behavior based profiling is combined with static attribute classification. In some embodiments, the behavior based profiling is performed as a second tier based on entities where the static attribute classification does not meet a confidence threshold.

At block 212, one or more behaviors particular to the entity being profiled are determined. The events or behaviors may be extracted or selected from the traffic data, logs, information from other systems and include URLs, file transfer details (e.g., file type, size, packet size, etc.), authentication details, threat information, streaming information, service information, client session property, and telemetry. The behavior may be summarized as a list of behavior events (e.g., with timestamps). In some embodiments, the summarized behavior may be sent to a remote resource (e.g., in a cloud) for analysis and for determining a profile (e.g., blocks 214-218).

At block 214, one or more sequences of behaviors are determined. Using the behaviors determined for the entity being profiled, a time series analysis is performed on the behaviors for temporal correlation and event correlation. The correlation can include determining behaviors that occur in sequence over and over. For example, behaviors that occur first and within a particular time period may be determined and behaviors subsequent thereto may be determined as well. As another example, devices could be communicating with a Programmable Logic Controller (PLC) through a heartbeat message in an industrial system (e.g., the RSLogix™ system from Rockwell Automation, Inc. send a heartbeat every three seconds). If this pattern of heartbeat messages is detected over time, this can be used as a strong signal or indication to identify this as behavior of the PLC module (e.g., which may then be used to generate a profile for the PLC module).

In some embodiments, the information accessed in blocks 204-210 may be gathered locally on a network and the behavior extracted locally and then sent for behavior sequence determination (e.g., blocks 214-218) on a remote system (e.g., in the cloud).

At block 216, a profile based on at least one sequence of the behaviors is determined. The profile may include a classification and a state machine, a set of rules, attributes, or other data structure of the behaviors, associated with the classification, and which behaviors an entity can be matched against to classify an entity. The profile indicating the classification of an entity may be based on human knowledge (e.g., a human confirming or providing the vendor, model, and other details of the entity based on the IP address of the device or the device being in a lab), a model trained by machine learning, a set of heuristics, or other methods.

At block 218, the profile is stored. The profile may be stored and then used for classification of one or more entities (e.g., process 400). In some embodiments, the profile may be provided (e.g., pushed) or made available (e.g., available as an update) to an entity performing classification (e.g., network monitor device 102 performing process 400). Block 202 may then be performed (e.g., for determining a profile for another entity).

At block 220, the profile may optional be validated. The validation may be done using human validation (e.g., human confirmation of the profile accuracy) or statistical validation (e.g., if there is enough confidence or enough samples to say that a profile is correct). Block 202 may then be performed (e.g., for determining a profile for another entity). In some embodiments, after blocks 218 or 220, the profile may be provided (e.g., pushed) or made available (e.g., available as an update) to an entity performing classification (e.g., network monitor device 102 performing process 400).

Figure 3:
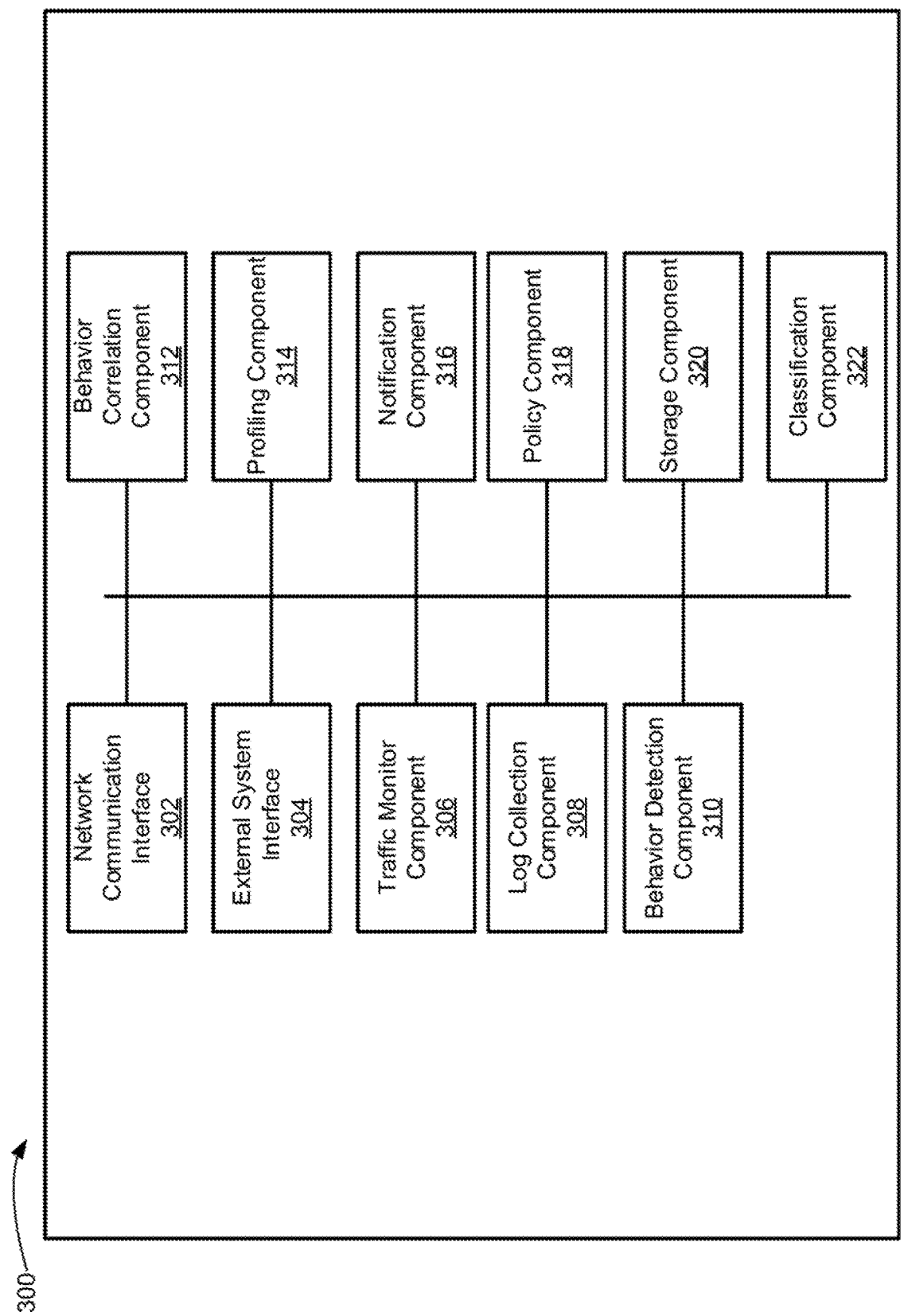
FIG. 3 depicts illustrative components of a system for determining a profile based on behavior in accordance with one implementation of the present disclosure.
Figure 5:
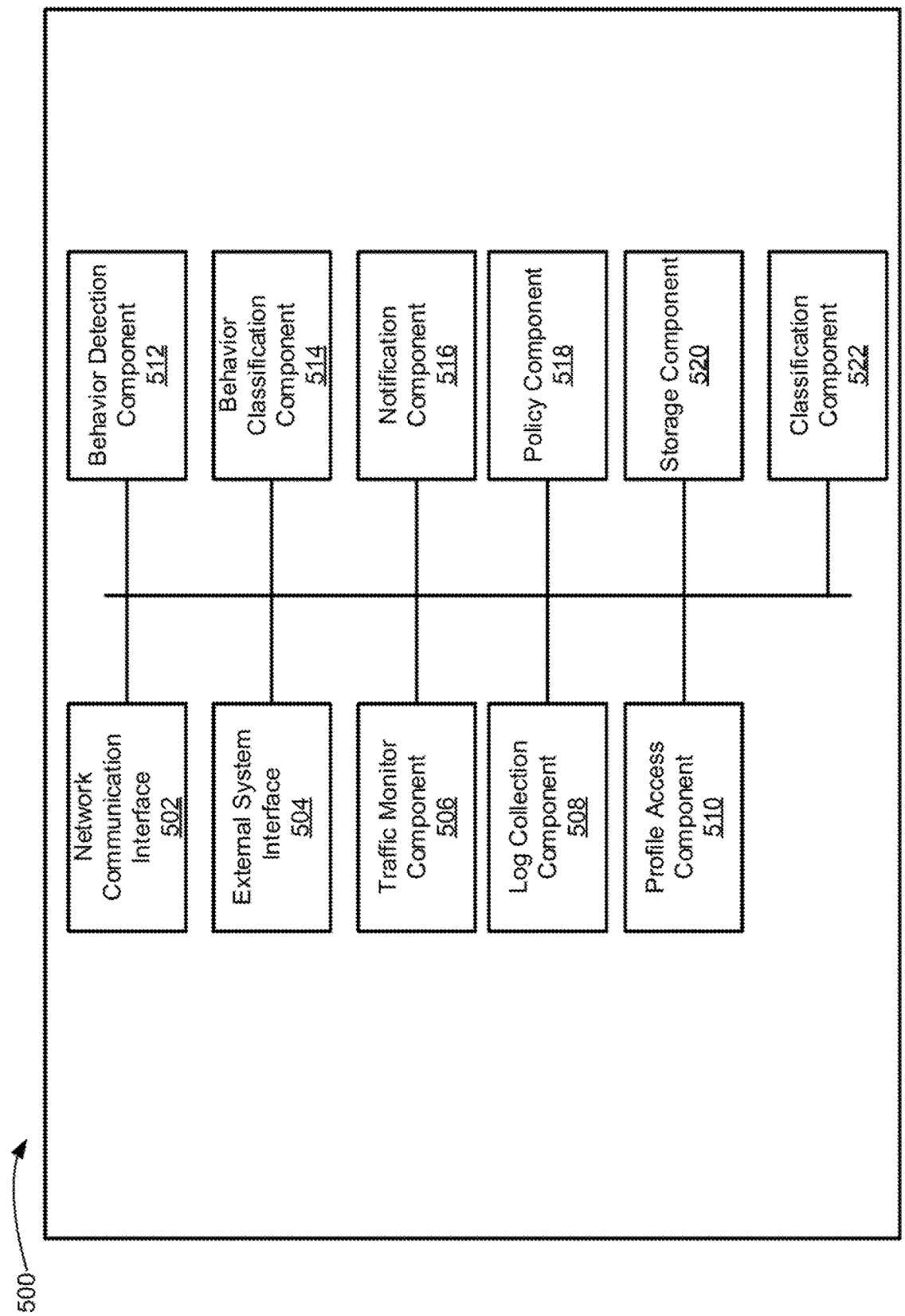
FIG. 5 depicts illustrative components of a system for determining a classification based on a profile comprising behavior information in accordance with one implementation of the present disclosure.

FIGS. 3 and 5 illustrate example components used by various embodiments. Although specific components are disclosed in systems 300 and 500, it should be appreciated that such components are examples. That is, embodiments are well suited to having various other components or variations of the components recited in systems 300 and 500. It is appreciated that the components in systems 300 and 500 may operate with other components than those presented, and that not all of the components of systems 300 and 500 may be required to achieve the goals of systems 300 and 500.

FIG. 3 depicts illustrative components of a system for determining a profile based on behavior in accordance with one implementation of the present disclosure. Example system 300 includes a network communication interface 302, an external system interface 304, a traffic monitor component 306, a log collection component 308, a behavior detection component 310, a behavior correlation component 312, a profiling component 314, a notification component 316, a policy component 318, a storage component 320, and classification component 322. The components of system 300 may be part of a computing system or other electronic device (e.g., network monitor device 102) or a virtual machine and be operable to monitor and one or more devices communicatively coupled to a network. For example, the system 300 may further include a memory and a processing device, operatively coupled to the memory, which may perform the operations of or execute the components of system 300. The components of system 300 may access various data associated with one or more devices that are local or remote (e.g., on one or more networks, in cloud systems, etc.). It is appreciated that the modular nature of system 300 may allow the components to be independent and allow flexibility to enable or disable individual components or to extend, upgrade, or combination thereof components without affecting other components thereby providing scalability and extensibility. System 300 may perform one or more blocks of flow diagram 200.

In some embodiments, system 300 may be implemented as a plugin with the operations described herein, or logic combination of multiple components within current infrastructure (e.g., log collection from a packet engine and a syslog plugin, behavior detection and correlation from a classification engine, profile generation from a plugin, etc.).

Communication interface 302 is operable to communicate with one or more devices (e.g., network device 104) coupled to a network that are coupled to system 300 and receive or access information about devices (e.g., properties or information associated with entities, endpoints, etc.) coupled to the network, as described herein. The communication interface 302 may be operable to work with one or more components to initiate the communication with one or more resources to determine information to be used for profiling or classification.

External system interface 304 is operable to communicate with one or more third party, remote, or external systems (e.g., system 150) to access information about one or more devices, entities, or a combination thereof. External system interface 304 may further store the accessed information in a data store (e.g., via storage component 320). For example, external system interface 304 may access information from a cloud based system thereby enabling system 300 to profile or classify devices in a cloud based system. External system interface 304 may be operable to communicate with a vulnerability assessment (VA) system, an advanced threat detection (ATD) system, an endpoint management system, a mobile device management (MDM) system, a firewall (FW) system, a switch system, an access point (AP) system, etc. External system interface 304 may query a third party system (e.g., system 150) using an API or CLI. For example, external system interface 304 may query a firewall for information of devices behind the firewall, or threat associated therewith.

Traffic monitor component 306 is operable to monitor network traffic from a variety of sources, as described herein. Log collection component 308 is operable to monitor and collect network traffic logs and collect other log information, including raw data, as described herein. The log information may include traffic logs and syslog information, which may further include static attributes. In some embodiments, log collection module 308 accesses information or logs from one or more security information and event management (SIEM) systems, an IoT aggregator (e.g., aggregation device 106) or IoT gateway, firewall logs (e.g., including malicious behavior logs), etc.

Behavior detection component 310 is operable to analyze the log information and summarize different behavior events such as authentication, file transfer, telemetry, stream, etc., as well as URL filtering results, threat analysis, services running, etc., as described herein. In some embodiments, behavior detection component 310 applies algorithms, heuristics, or a combination thereof to extract behaviors from traffic logs and syslogs. In various embodiments, a decoder is used to scan the logs (and other data) and parse the payload. For example, entity behavior associated with authentication can be determined based on accessing syslog information or network traffic. Entity behavior that matches a malicious report from a third party system (e.g., firewall or SIEM) may be used to determine behavior associated with the entity and the compromise or attack.

Embodiments may support identifying behavior of an entity that has been compromised. One or more state machines or rules sets may be determined that can be used to identify a compromised entity and classify the entity based on the compromise or malicious behavior. For example, behavior associated with the Mirai attack may be used to classify an entity as an IP camera and take action based on the malicious device behavior. Use of malicious behavior profiles for classification can be useful for classifying a compromised device upon coming onto a network.

Behavior correlation component 312 is operable to use the results from the behavior detection component 310 to do behavior and event correlation from a temporal perspective, as described herein. The time window for temporal correlation can be adjusted based on different factors such as confidence of detection, requirements of detection delay, CPU/memory limitations, volume of traffic, etc. In some embodiments, machine learning techniques or time series analysis can be applied to correlate multiple behaviors across sessions.

For confidence detection, the number of events within a particular time period can be used to evaluate confidence. For example, if most events for an entity occur within a five minute time window and some events occur within the five minute window after the first five minute window (or a ten minute window), then the behavior analysis for the five minute window will be considered more confident. If the time window was expanded to ten minutes, there might be more false positives with other entities.

The requirements of detection delay takes into consideration the time window being used to detect behavior. For example, a five minute time window for behavior will allow profiling of an entity based on five minutes of data collection, whereas a ten minute time window will take twice as long as the five minute window to gather the behavior data. In some embodiments, remote compute resources (e.g., cloud resources) may be used for longer time window analysis of behavior and local compute resources may be used for shorter time window analysis (e.g., five minutes).

The CPU/memory limitations refers to the available resources on the entity performing profiling (e.g., network monitor device 102). For example, shorter time behavior analysis windows (e.g., five minutes) may be given priority to CPU and memory resources over longer time behavior analysis windows (e.g., 24 hours, 48 hours, etc.). Longer time behavior analysis tasks may be allocated to remote compute resources (e.g., cloud).

The consideration of volume of traffic can be based on the trend that certain entities (e.g., computers) will generate a lot or more traffic in a minute (e.g., transferring files, streaming video, downloading webpages) than some IoT device (e.g., a smart light bulb will generate a relatively small amount of traffic compared to a computer). Further, some IoT devices might not communicate for long periods of time (e.g., more than a day) and thus analysis over a longer time period is needed to determine behavior. Embodiments may further store more logs in remote resources (e.g., a cloud) to enable additional behavior sample analysis.

Profiling component 314 is operable to determine an entity profile based on the behavior correlation performed by behavior correlation component 312. Profiling component 314 can generate a profile for each entity type that includes heuristics that may be represented by a set of rules or a finite-state-automaton (FSA) or state machine model. An example, FSA model is show in FIG. 6. A profile may be generated using machine learning, human analysis, or a combination thereof. Where a human is involved, a summary of the behavior from behavior detection component 310 may be displayed or shown to a user to construct the profile (e.g., state machine or rules), validate the profile, or both.

In some embodiments, the profiles may be determined using remote compute resources (e.g., cloud resources) where samples from multiple networks or sources are used to refine and increase confidence of the profile. The profile may then be sent out to various entities (e.g., network monitor device 102) for use in classification.

Notification component 316 is operable to initiate one or more notifications based on the results of policies applied to one or more entities, endpoints, or a combination thereof, as described herein. The notification may be any of a variety of notifications, e.g., IT ticket, email, SMS, a HTTP notification, etc., as described herein.

Policy component 318 is operable for initiating or triggering one or more classification, remediation actions or security actions with respect to devices, entities, endpoints, or a combination thereof, as described herein. Policy component 318 may further be configured to perform other operations including checking entity compliance status, checking endpoint compliance status, finding open ports, etc. Policy component 318 may restrict network access of an entity (e.g., of an account, a network device, cloud resources, etc.), as described herein. The policy component 318 may thus, among other things, invoke automatically restrict network access of one or more entities and one or more entities.

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Storage component 320 is operable to store information of classification results related to entities present on a network (e.g., local, remote, etc.) and to store information associated with classification methods and associated models, as described herein, for future access and application of one or more policies.

Classification component 322 is configured to perform classification of devices using a plurality of attributes, as described herein. Classification component 322 may perform the classification using information from network communication interface 302, external system interface 304, and traffic monitor component 306. In some embodiments, classification component 308 may perform an initial classification (e.g., passive traffic analysis classification) which may then be used with behavior data to determine behavior profiles, as described herein. In various embodiments, classification component 308 may access classification performed by another system or resource.

The system 300 may be software stored on a non-transitory computer readable medium having instructions encoded thereon that, when executed by a processing device, cause the processing device to access data associated with one or more communications of an entity and determine one or more behaviors based on the data associated with the one or more communications of the entity. The instructions may further cause the processing device to determine one or more sequences of the one or more behaviors of the entity and determine a profile based on the one or more sequences of the one or more behaviors. The profile comprises a classification of the entity. The instructions may further cause the processing device to storing the profile.

In some embodiments, the profile comprises a sequence of behaviors associated with the classification. In various embodiments, the profile further comprises an attribute associated with the entity. In some embodiments, the one or more communications associated with the entity are accessed from at least one of a log, traffic data, information from an external system, or classification information. In various embodiments, the classification information is based on an attribute associated with the entity. In some embodiments, the one or more sequences of behavior comprises a plurality of behaviors associated with a period of time. In various embodiments, the profile comprises a state machine, and wherein at least one state of the state machine is associated with an occurrence of a first behavior. In some embodiments, the profile comprises a plurality of rules. In various embodiments, the plurality of rules comprises at least one conditional rule. In some embodiments, the storing comprises uploading the profile to a remote system. In various embodiments, the instructions may further cause the processing device to validate the profile.

FIG. 4 depicts a flow diagram of aspects of a method for determining a classification based on a profile comprising behavior information in accordance with one implementation of the present disclosure. Flowchart 400 shows a process for classifying an entity based on one or more profiles (e.g., generated by process 200 or system 300). The profiles can be used for classifying devices based on behavior and optionally attributes. Various portions of flowchart 400 may be performed by different components (e.g., components of system 500) of an entity (e.g., network monitor device 102). For example, the process of flowchart 400 may be performed by a NAC device as part of a classification process. Embodiments support various blocks of flowchart 400 being performed locally on a network, remotely (e.g., in the cloud), or any combination thereof.

At block 402, one or more attributes associated with an entity are accessed. The attributes may be accessed from a variety of sources (e.g., network devices, external systems, etc.). The attributes accessed may be static attributes (e.g., MAC address, DHCP, Nmap™, or packet payload strings).

At block 404, a classification of the entity based on the one or more attributes is determined. The classification may be classification based on static attributes, as described herein. The type of environment may also be determined based on this classification (e.g., a hospital, industrial, campus, data center, or other environment).

The initial classification may be performed using less disruptive or invasive methods, e.g., passive traffic monitoring as opposed to active probing. Based on the initial classification, certain methods, e.g., active probing, may be disabled for environments having medical, operational technology devices, or infrastructure technology or other devices that are sensitive to particular methods (e.g., active probing).

In some embodiments, it may not be possible to classify the entity with enough confidence or certainty or the one or more attributes may not be sufficient to determine a classification of the entity (e.g., there is classification conflict or the confidence is below a threshold). The behavior based profiling may be combined with static attribute classification. In some embodiments, the behavior based profiling is performed as a second tier based on entities where the static attribute classification does not meet a confidence threshold.

At block 406, whether the entity is not classified or an uncertain (e.g., a conflict classification or below a threshold) classification is determined. If the entity has been classified, block 430 may be performed. If the entity has not been classified or the classification is uncertain (e.g., below a confidence threshold), block 408 may be performed.

At block 408, traffic data is accessed. The traffic data may be accessed from various network devices including, but not limited to, a switch, a firewall, a router, a wireless access point, etc. The traffic data accessed may be pre-filtered or a selected portion of traffic on a network. For example, the traffic data may be accessed for a particular VLAN, portion of the network, or segment of the network (e.g., where an unknown entity has been recorded communicating) to filter the traffic data.

At block 410, one or more logs are accessed. The logs may be various traffic, communication, or other transaction based logs (e.g., an authentication log). The logs may be accessed from a variety of sources including, but not limited, to servers on a network (e.g., file servers, web servers, applications servers, etc.), network devices (e.g., switches, firewalls, routers, etc.), and other systems (e.g., a vulnerability assessment (VA) system, a threat detection (TD) system, an endpoint management system, a mobile device management (MDM) system, a firewall (FW) system, a switch system, an access point system, a SIEM system, etc.).

At block 412, information from another system (e.g., system 150) is accessed. The other systems may include, but are not limited to, a vulnerability assessment (VA) system, a threat detection (TD) system, an endpoint management system, a mobile device management (MDM) system, a firewall (FW) system, a switch system, an access point system. The information may include vulnerability information, threat information, mobile device information, network communication behavior, etc.

At block 414, one or more entity behavior profiles are accessed. The entity behavior profiles may include a classification and a state machine, a set of rules, attributes, or other data structure of the behaviors, associated with the classification, and be operable for matching with entity behaviors to classify an entity.

At block 416, one or more behaviors are determined. Events or behaviors may be extracted or selected from the traffic data, logs, information from other systems and include URLs, file transfer details (e.g., file type, size, packet size, etc.), authentication details, threat information, streaming information, service information, client session properties, and telemetry, as described herein.

At block 418, a classification based on the one or more entity behavior profiles is determined. The classification is based on matching the one or more behaviors of an entity to one or more behaviors in the one or more entity behavior profiles. The events or behaviors may be compared to one or more entity behavior profiles and based on a match or substantial match of the behaviors and a profile, the classification associated with the profile is determined. For example, the behaviors may be matched to various states of a state machine of a profile. The behaviors could also be matched to rules of a profile. For example, the rules may define a sequence of behaviors and the behaviors in time match the sequence of behaviors.

At block 420, the classification is stored. The classification may be stored and then used for enforcing policies on a network (e.g., network 100). The classification may further be used to monitor entity activity on the network to detect compromises or attacks. Block 430 may then be performed (e.g., for determining if there is another entity to be classified).

At block 422, one or more policies may be applied, if applicable. The one or more policies may be applied based on the classification of an entity satisfying a condition of the policy and one or more actions performed based on the policy, as described herein.

At block 430, whether there is another entity to be classified is determined. If there is another entity to be classified, block 402 may be performed. If there is not another entity to be classified, block 432 is performed.

At block 432, the classification process is complete (e.g., for the entities currently communicatively coupled to the network). Process 400 may be performed again in response to a variety of events including, but not limited to, upon a new entity being communicatively being coupled to the network, an entity changing (e.g., a new user logging in, a software change, etc.), the passage of period of time (e.g., periodic classification scans), manual classification re-check, or during continuous classification scans.

FIG. 5 depicts illustrative components of a system for determining a classification based on a profile comprising behavior information in accordance with one implementation of the present disclosure. Example system 500 includes a network communication interface 502, an external system interface 504, a traffic monitor component 506, a log collection component 508, a profile access component 510, a behavior detection component 512, a behavior classification component 514, a notification component 516, a policy component 518, a storage component 520, and classification component 522. The components of system 500 may be part of a computing system or other electronic device (e.g., network monitor device 102) or a virtual machine and be operable to monitor and one or more devices communicatively coupled to a network. For example, the system 500 may further include a memory and a processing device, operatively coupled to the memory, which may perform the operations of or execute the components of system 500. The components of system 500 may access various data associated with one or more devices that are local or remote (e.g., on one or more networks, in cloud systems, etc.). It is appreciated that the modular nature of system 500 may allow the components to be independent and allow flexibility to enable or disable individual components or to extend/upgrade components without affecting other components thereby providing scalability and extensibility. System 500 may perform one or more blocks of flow diagram 400.

In some embodiments, system 500 may be implemented as a plugin with the operations described herein, or logic combination of multiple components within current infrastructure (e.g., log collection from a packet engine and a syslog plugin, behavior detection and correlation from a classification engine, profile generation from a plugin, etc.).

Communication interface 502 is operable to communicate with one or more devices (e.g., network device 104) coupled to a network that are coupled to system 500 and receive or access information about devices (e.g., properties or information associated with entities, endpoints, etc.) coupled to the network, as described herein. The communication interface 502 may be operable to work with one or more components to initiate the communication with one or more resources to determine information to be used for profiling or classification.

External system interface 504 is operable to communicate with one or more third party, remote, or external systems (e.g., system 150) to access information about one or more devices, entities, or a combination thereof. External system interface 504 may further store the accessed information in a data store (e.g., via storage component 520). For example, external system interface 504 may access information from a cloud based system thereby enabling system 500 to classify devices in a cloud based system. External system interface 504 may be operable to communicate with a vulnerability assessment (VA) system, an advanced threat detection (ATD) system, an end point management system, a mobile device management (MDM) system, a firewall (FW) system, a switch system, an access point (AP) system, SIEM system, etc. External system interface 504 may query a third party system (e.g., system 150) using an API or CLI. For example, external system interface 504 may query a firewall for information of devices behind the firewall or threat associated therewith.

Traffic monitor component 506 is operable to monitor network traffic from a variety of sources, as described herein. Log collection component 508 is operable to monitor and collect network traffic logs and collect other log information, including raw data, as described herein. The log information may include traffic logs and syslog information, which may further include static attributes. In some embodiments, log collection module 508 accesses information or logs from one or more security information and event management (SIEM) systems, an IoT aggregator (e.g., aggregation device 106) or IoT gateway, firewall logs (e.g., including malicious behavior logs), etc.

Profile access component 510 is operable for accessing profiles for use in classifying one or more entities based on behavior, as described herein. The entity behavior profiles may include a classification and a state machine, a set of rules, attributes, or other data structure of the behaviors, associated with the classification, and be operable for matching with entity behaviors to classify an entity. The profiles may be accessed locally (e.g., network monitor device 102 or other entity performing classification) or from remote resources (e.g., cloud resources, other network monitor devices, other entities, etc.).

Behavior detection component 512 is operable to analyze the log information and summarize different behavior events (e.g., as authentication, file transfer, telemetry, stream, etc., as well as URL filtering results, threat analysis, services running, etc.), as described herein. In some embodiments, behavior detection component 512 applies algorithms, heuristics, or a combination thereof to extract behaviors from traffic logs and syslogs. In various embodiments, a decoder is used to scan the logs (and other data) and parse the payload. For example, entity behavior associated with authentication can be determined based on accessing syslog information or network traffic.

Entity behavior that matches a malicious report from a third party system (e.g., firewall or SIEM) may be used to determine behavior associated with the entity and the compromise or attack. Embodiments may thus support classifying an entity based on behavior of an entity that has been compromised. One or more state machines or rules sets associated with compromise or malicious behavior may be used to identify or classify a compromised entity. For example, behavior associated with the Mirai attack may be used to classify an entity as an IP camera and take action based on the malicious device behavior. Use of malicious behavior profiles for classification can be useful for classifying a compromised device upon coming onto a network.

Behavior classification component 514 is operable to determine a classification for an entity based on the behavior of the entity matching or substantially matching the behavior of a profile, as described herein. The one or more sequences of behavior of an entity matching a profile can be used to determine a classification of the entity. The events or behaviors may be extracted or selected from the traffic data, logs, information from other systems and include URLs, file transfer details (e.g., file type, size, packet size, etc.), authentication details, threat information, streaming information, service information, client session properties, and telemetry. The events of behaviors may then be compared to one or more entity behavior profiles and based on a match or substantial match of the behaviors and a profile, the classification associated with the profile is determined. For example, the behaviors may be matched to various states of a state machine of a profile. The behaviors could also be matched to rules of a profile. For example, the rules may define a sequence of behaviors and the behaviors in time match the sequence of behaviors.

In some embodiments, the classification of the entity based on the behavior profile may be based on behavior of the entity and one or more attributes, as described herein. The classification based on behavior may be performed using local compute resources, remote compute resources, or a combination thereof.

Notification component 516 is operable to initiate one or more notifications based on the results of policies applied to one or more entities, endpoints, or a combination thereof, as described herein. The notification may be any of a variety of notifications, e.g., IT ticket, email, SMS, a HTTP notification, etc., as described herein.

Policy component 518 is operable for initiating or triggering one or more classification, remediation actions or security actions with respect to devices, entities, endpoints, or a combination thereof, as described herein. Policy component 518 may further be configured to perform other operations including checking entity compliance status, checking endpoint compliance status, finding open ports, etc. Policy component 518 may restrict network access of an entity (e.g., of an account, a network device, cloud resources, etc.), as described herein. The policy component 518 may thus, among other things, invoke automatically restrict network access of one or more entities and one or more entities.

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Storage component 520 is operable to store information of classification results related to entities present on a network (e.g., local, remote, etc.) and to store information associated with classification methods and associated models, as described herein, for future access and application of one or more policies.

Classification component 522 is configured to perform classification of devices using a plurality of attributes, as described herein. Classification component 522 may perform the classification using information from network communication interface 502, external system interface 504, and traffic monitor component 506. In some embodiments, classification component 508 may perform an initial classification (e.g., passive traffic analysis classification) which may then be used with behavior data to determine behavior profiles, as described herein. In various embodiments, classification component 508 may access classification performed by another system or resource.

The system 500 may be software stored on a non-transitory computer readable medium having instructions encoded thereon that, when executed by a processing device, cause the processing device to access data associated with one or more communications of an entity and access one or more entity profiles. The entity profiles comprises one or more behavior sequences. The instructions may further cause the processing device to determine one or more behaviors from the data associated with one or more communications of the entity and determine a classification of the entity based on a matching of a behavior sequence of at least one entity profile of the one or more entity profiles with the one or more behaviors determined from the data associated with the one or more communications of the entity. The instructions may further cause the processing device to store the classification.

In some embodiments, at least one profile further comprises an attribute. In various embodiments, the one or more communications associated with the entity are accessed from at least one of a log, traffic data, information from an external system, or classification information. In some embodiments, the classification information is based on an attribute associated with the entity. In various embodiments, the one or more behavior sequences comprise a plurality of behaviors associated with a period of time. In some embodiments, the profile comprises a state machine, and wherein at least one state of the state machine is associated with an occurrence of a first behavior. In various embodiments, the profile comprises a plurality of rules, and the plurality of rules comprises at least one conditional rule. In some embodiments, the data associated with the one or more communications of the entity comprises information associated with an environment comprising the entity. In various embodiments, the instructions may further cause the processing device to apply a policy based on the classification of the entity.

Figure 6:
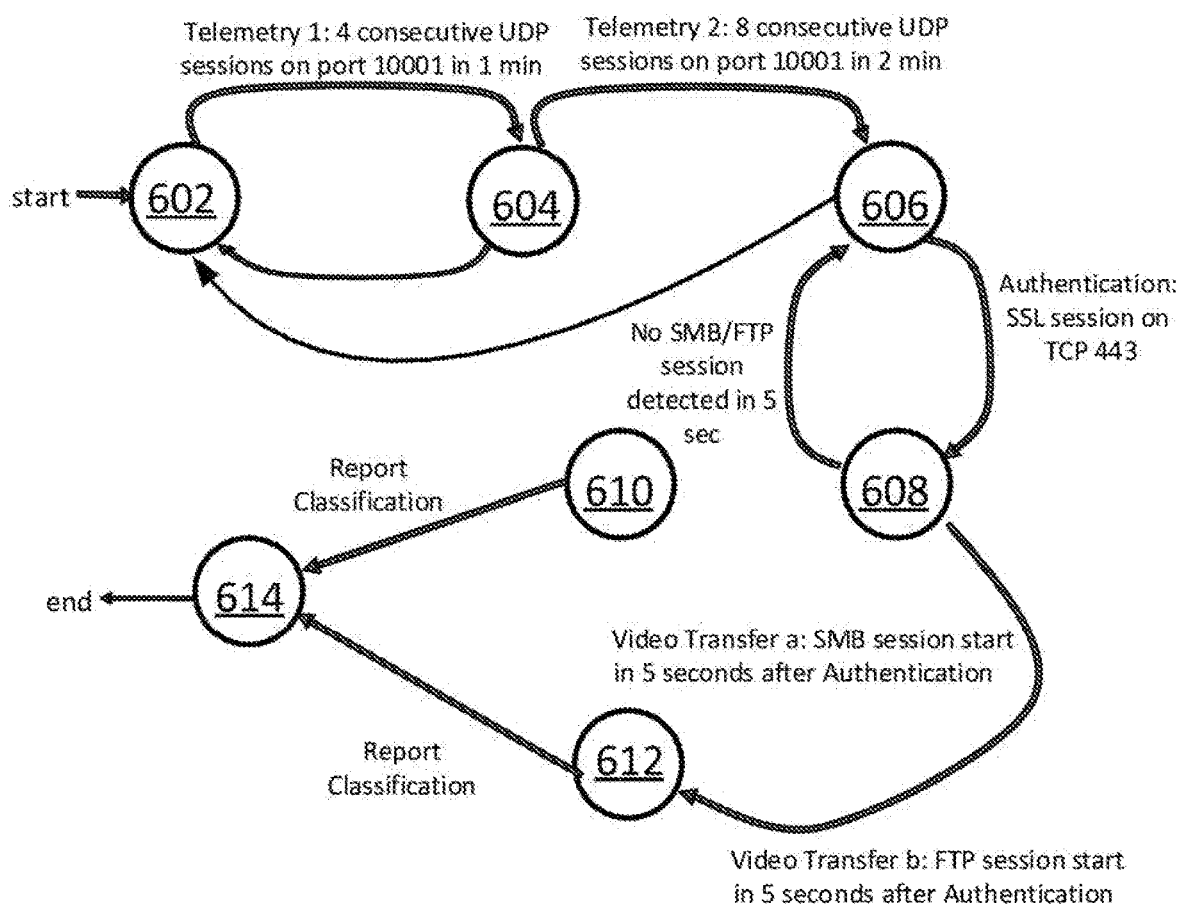
FIG. 6 depicts a diagram of aspects of an example profile including behavior information in accordance with one implementation of the present disclosure.

FIG. 6 depicts a diagram of aspects of an example profile including behavior information in accordance with one implementation of the present disclosure. Example diagram 600 depicts an example state machine of a profile, as described herein.

A sequence of behaviors can be used to classify an IP camera as an IP camera made by a particular vendor or manufacturer. An IP camera may have a peer-to-peer telemetry feature. For example, a Foscam™ camera may contact multiple IP addresses on UDP port 10001 every 10-15 seconds. This behavior is unique to Foscam™ cameras. After motion is detected, the camera will try to transfer the video recording to a pre-configured FTP or SMB server. The video transfer process follows a distinct sequence and pattern, starting with an SSL authentication session and then the data session with a fixed packet size, port, and protocol. A state machine can be used to detect sequences of behavior that are unique to the device.

The example state machine of diagram 600 shows how an IP camera can be detected, classified, or a combination thereof based on behavior. The state machine starts in state 602 and moves to state 604 upon detection of a telemetry of four consecutive UDP sessions on port 10001 in one minute. The state machine may then moves to state 606 upon detection of eight consecutive UDP sessions on port 10001 (e.g., in the second minute). If the eight consecutive UDP sessions on port 10001 (e.g., in the second minute) are not detected, then the state machine may move to state 602.

The state machine may then move to state 608 upon detecting an authentication using SSL on port 443. If the authentication using SSL on port 443 is not detected (e.g., within a particular period of time) then the state machine may move to state 602.

From state 608, the state machine may move to state 610 upon detection of a video transfer with to an SMB server that is within five seconds after authentication. The state machine may move to state 612 upon detection of a video transfer to a FTP server that is within five seconds after authentication. If no SMB or FTP session is detected within five seconds, then the state machine moves to state 606.

From states 610 and 612, the classification may then be reported and the state machine may move to state 614 (e.g., upon successful reporting of the classification). From state 614, the state machine ends.

Embodiments support profiles with rules that may correspond to a state machine or be used in place of a state machine. So for the IP camera with the state machine of diagram 600, the rules could be match four consecutive UDP sessions on port 10001 in the first minute, then match eight consecutive UDP sessions on port 10001 in the second minute, then match authentication, then an SMB session or FTP session within the five seconds after the authentication. Embodiments may support profiles with rules that may correspond to a state machine. As another example, the rules may include matching the behavior between states 602 and 604, then matching the behavior between states 604 and 606, then matching the behavior between states 606 and 608, then matching the behavior between states 608 and 610 or 612.

Figure 7:
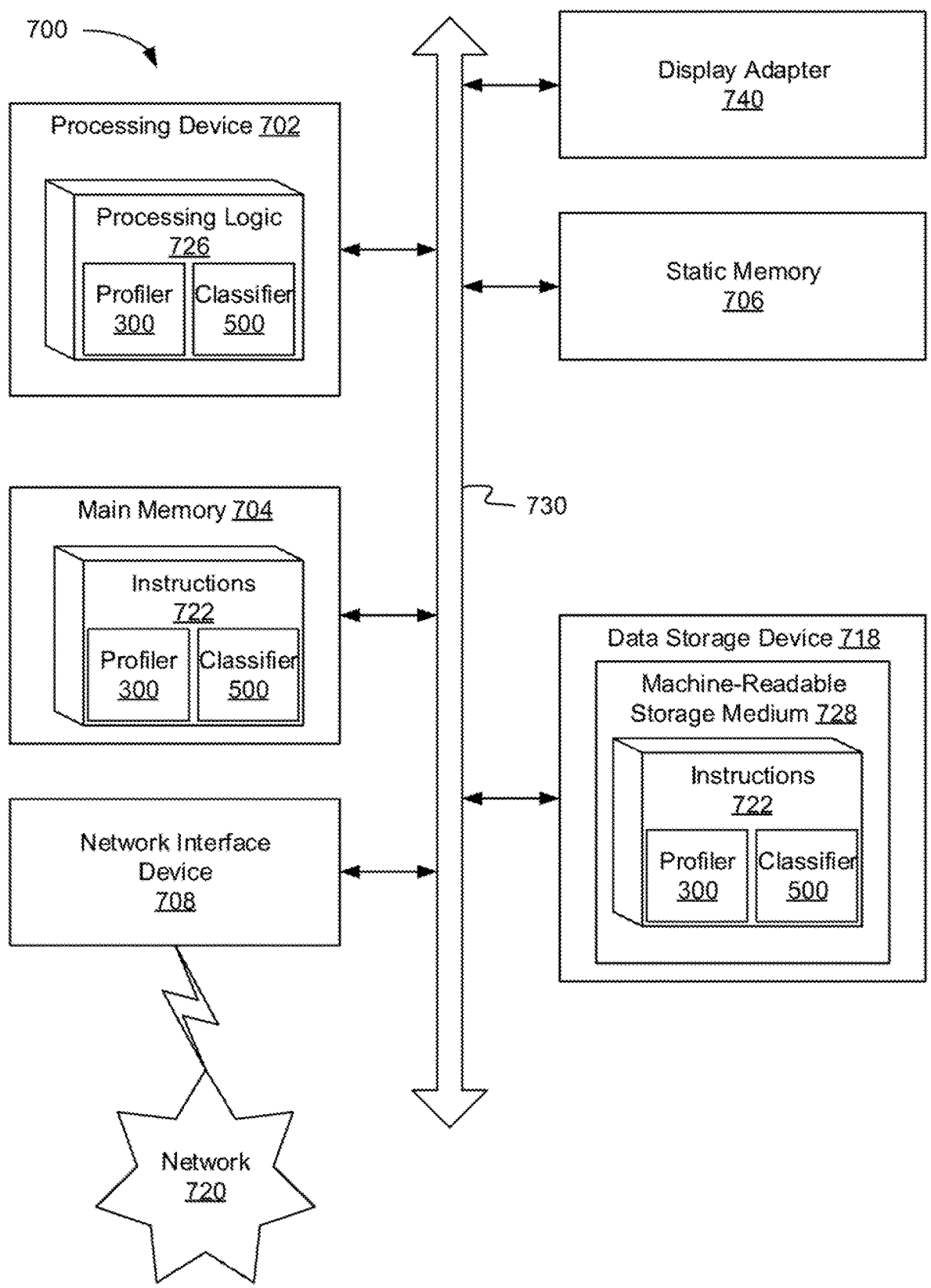
FIG. 7 is a block diagram illustrating an example computer system, in accordance with one implementation of the present disclosure.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server, such as network monitor device 102 configured to determine a profile (e.g., a behavior based profile) of an entity, classify an entity based on one or more profiles, or a combination thereof, as described herein.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), a data storage device 718 (e.g., storage component 620 or operable in conjunction therewith), and display adapter 740, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of systems 300 or 500 shown in FIGS. 3 and 5, for performing the operations and steps discussed herein.

The data storage device 718 may include a machine-readable storage medium 728, on which is stored one or more set of instructions 722 (e.g., software) embodying any one or more of the methodologies of operations described herein, including instructions to cause the processing device 702 to execute profiler 300, classifier 500, or both. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform methods for determining a profile (e.g., a behavior based profile) of an entity or classifying an entity based on one or more profiles, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Display adapter 740 may be a graphics processing unit (GPU) or other visually configured or related output device and be configured for output of video, audio, and other signals to a display device (not shown). In some embodiments, display adapter 740 may be configured for communicatively coupling with a display device and outputting thereto. In various embodiments, display adapter 740 may include a display device. Display adapter 740 may work with display component 614 to render, output, or a combination thereof one or more GUIs and text based interfaces including information associated with classification methods or models.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   accessing data associated with one or more communications of a first entity on a network;
   determining one or more behaviors based on the data associated with the one or more communications of the first entity;
   determining one or more sequences of the one or more behaviors of the first entity, wherein the one or more sequences of behavior comprises a plurality of behaviors, wherein each of the plurality of behaviors is associated with a period of time;

determining, by a processing device, a profile of the first entity based on the one or more sequences of the one or more behaviors, wherein the profile comprises a classification of the first entity;

determining, by the processing device, a state machine of the profile of the first entity, wherein the state machine is associated with the classification against which the one or more behaviors can be matched;

detecting a second entity coming onto the network; and classifying, responsive to detecting the second entity coming onto the network, the second entity based on the state machine of the profile of the first entity.

2. The method of claim 1, wherein the profile further comprises at least one static attribute associated with the first entity.

3. The method of claim 1, wherein the one or more communications associated with the first entity are accessed from at least one of a log, traffic data, information from an external system, or classification information.

4. The method of claim 3, wherein the classification information is based on an attribute associated with the first entity.

5. The method of claim 1, wherein the state machine comprises one or more states corresponding to each of the one or more behaviors to be matched.

6. The method of claim 1, further comprising:
uploading the profile to a remote system; and
validating the profile for accuracy.

7. A system comprising:
a memory; and
a processing device, operatively coupled to the memory, to:
  access data associated with one or more communications of a first entity on a network;
  determine one or more behaviors based on the data associated with the one or more communications of the first entity;
  determine one or more sequences of the one or more behaviors of the first entity, wherein the one or more sequences of behavior comprises a plurality of behaviors, wherein each of the plurality of behaviors is associated with a period of time;
  determine a profile of the first entity based on the one or more sequences of the one or more behaviors, wherein the profile comprises a classification of the first entity;
  determine a state machine of the profile of the first entity, wherein the state machine is associated with the classification against which the one or more behaviors can be matched;
  detect a second entity coming onto the network; and
  classify, responsive to detecting the second entity coming onto the network, the second entity based on the state machine of the profile of the first entity.

8. The system of claim 7, wherein the profile further comprises at least one static attribute associated with the first entity.

9. The system of claim 7, wherein the one or more communications associated with the first entity are accessed from at least one of a log, traffic data, information from an external system, or classification information.

10. The system of claim 9, wherein the classification information is based on an attribute associated with the first entity.

11. The system of claim 7, wherein the state machine comprises one or more states corresponding to each of the one or more behaviors to be matched.

12. The system of claim 7, wherein the processing device is further to:
upload the profile to a remote system; and
validate the profile for accuracy.

13. A non-transitory computer readable medium having instructions encoded thereon that, when executed by a processing device, cause the processing device to:
  access data associated with one or more communications of a first entity on a network;
  determine one or more behaviors based on the data associated with the one or more communications of the first entity;
  determine one or more sequences of the one or more behaviors of the first entity, wherein the one or more sequences of behavior comprises a plurality of behaviors, wherein each of the plurality of behaviors is associated with a period of time;
  determine, by the processing device, a profile of the first entity based on the one or more sequences of the one or more behaviors, wherein the profile comprises a classification of the first entity;
  determine, by the processing device, a state machine of the profile of the first entity, wherein the state machine is associated with the classification against which the one or more behaviors can be matched;
  detect a second entity coming onto the network; and
  classify, responsive to detecting the second entity coming onto the network, the second entity based on the state machine of the profile of the first entity.

14. The non-transitory computer readable medium of claim 13, wherein the profile further comprises at least one static attribute associated with the first entity.

15. The non-transitory computer readable medium of claim 13, wherein the one or more communications associated with the first entity are accessed from at least one of a log, traffic data, information from an external system, or classification information.

16. The non-transitory computer readable medium of claim 15, wherein the classification information is based on an attribute associated with the first entity.

17. The non-transitory computer readable medium of claim 13, wherein the state machine comprises one or more states corresponding to each of the one or more behaviors to be matched.

* * * * *